United States Patent [19]
McCauley

[11] 4,013,203
[45] Mar. 22, 1977

[54] LOCKABLE TIRE CARRIER
[76] Inventor: Willard Mack McCauley, Rte. 1, Box 230, Okolona, Ark. 71962
[22] Filed: May 8, 1975
[21] Appl. No.: 575,616
[52] U.S. Cl. .......................... 224/42.24; 224/42.25; 70/259; 211/8; 248/503
[51] Int. Cl.² ......................................... B62D 43/08
[58] Field of Search ......... 224/42.24, 42.25, 42.06, 224/29 R, 42.21, 42.2, 42.13; 70/260, 259, 258; 211/23, 24, 8, 89; 105/477, 464, 465, 485; 248/503, 500

[56] References Cited
UNITED STATES PATENTS

| 2,661,131 | 12/1953 | Roy | 224/42.26 |
| 2,674,394 | 4/1954 | Hall et al. | 224/42.24 |
| 2,825,522 | 3/1958 | Bolmes et al. | 105/367 |
| 3,613,972 | 10/1971 | Daughhetee | 224/42.24 |
| 3,823,858 | 7/1974 | Schnakenberg | 224/42.24 |

Primary Examiner—Robert J. Spar
Assistant Examiner—Jerold M. Forsberg
Attorney, Agent, or Firm—William S. Dorman

[57] ABSTRACT

A tire carrier for securing a spare tire to the bed of a pickup truck or the like wherein the tire is mounted on a conventional flanged rim having an opening therethrough which comprises a vertically disposed bracket member having vertically spaced notches therein and attachable to the bed of the pickup truck; a bracket-engaging member having a horizontally extending arm with an upward extension adjacent one end thereof, a threaded nut attached to the vertical extension, a threaded J-hooked rod threadedly received in the nut and having a hook at one end thereof adapted to engage one of the notches of the bracket when the bracket-engaging member is passed through the opening in the tire rim; a pivotal tire rim-engaging member including a pivotal arm pivotally connected to the opposite end of the bracket-engaging member, a handle member extending outwardly from the pivotal arm adjacent the pivotal connection, a horizontally extending keeper bar connected adjacent its horizontal center to the end of said pivotal arm opposite from the pivotal end, and adapted to engage the rim under pressure when the pivotal arm is in horizontal alignment with the horizontally extending arm, a tongue attached to one end of said keeper bar and extending at right angles thereto and adapted to lie adjacent the flange on the tire rim when the pivotal arm is pivoted by the handle so as to be in horizontal alignment with the horizontally extending arm; the pivotal arm and the horizontally extending arm having holes therein which are in alignment with the arms are in horizontal alignment, whereby a locking member can be passed through the holes when aligned to lock the apparatus with said spare tire thereon against the bed of the pickup truck.

4 Claims, 2 Drawing Figures

LOCKABLE TIRE CARRIER

BACKGROUND OF THE INVENTION

1. Field of the Invention

This invention relates to improvements in vehicle tire carriers and, more particularly, but not by way of limitation, to a lockable tire carrier for securing a spare tire to the bed of a pickup truck or the like.

2. Description of the Prior Art

Tire carriers for securing a spare tire to the bed of a pickup truck or the like are presently available; some of these tire carriers are lockable and some are not. Many of these tire carriers are difficult to install, difficult to manipulate, and many of these tire carriers are complicated and expensive.

SUMMARY OF THE INVENTION

The present invention contemplates a novel tire carrier which is simple to install on the bed of pickup truck. This tire carrier is also relatively simple of construction and inexpensive. Furthermore, this tire carrier is lockable to prevent the theft of the spare tire from the bed of the pickup truck. The tire carrier includes, first of all, a vertically disposed bracket member having vertically spaced notches therein and attachable to the bed of the pickup truck in any convenient location where it is desired to place the spare tire; the carrier also includes a bracket-engaging member having a longitudinally extending arm with an upward extension adjacent one end thereof, a threaded nut attached to the vertical extension and a threaded J-hooked rod threadedly received in the nut. The hook on the rod is adapted to engage one of the notches of the bracket when the bracket-engaging member is passed through the opening in the tire rim. The carrier also includes a pivotal tire rim-engaging member including a pivotal arm pivotally connected to the end of the bracket-engaging member opposite from the end where the J-hook is attached. A handle member extends outwardly from the pivotal arm adjacent the pivotal connection. A horizontally extending keeper bar is connected adjacent its horizontal center to end of the pivotal arm opposite from the pivotal end. The keeper bar is adapted to engage the rim of the tire under pressure when the pivotal arm is in horizontal alignment with the horizontally extending arm. A tongue is attached at right angles to one end of the keeper bar and extends so as to lie adjacent the flange on the tire rim when the pivotal arm is pivoted by the handle so as to be in horizontal alignment with the horizontally extending arm. The pivotal arm and the horizontally extending arm have holes therein which are in alignment when the arms are in horizontal alignment whereby a locking member, such as a padlock, can be passed through the holes, when aligned, to lock the tire carrier with the spare tire thereon against the bed of the pickup truck.

DESCRIPTION OF THE PREFERRED EMBODIMENT

Figure 1:
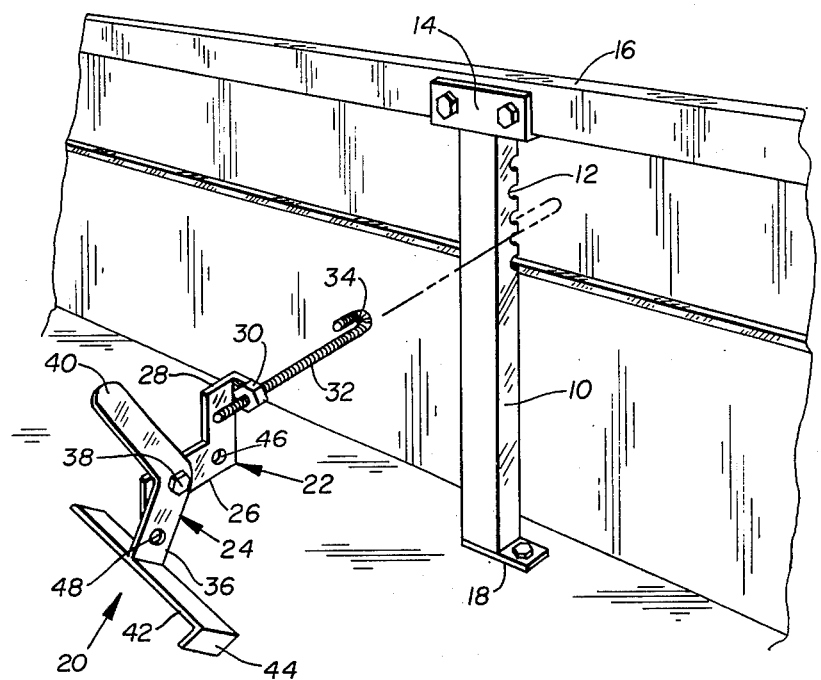
FIG. 1 is a perspective view of the tire carrier of the present invention, showing the parts in exploded relation, with the latch assembly in the open position, and showing a portion of a bed of a pickup truck.

Referring to the drawings in detail, FIG. 1 shows an angle bracket 10 having a plurality of vertically spaced notches 12. The upper end 14 of the bracket is suitably secured to the bed 16 of a pickup truck (only partially shown) in any convenient manner by bolts or welding or the like. The lower end 18 of the bracket is also suitably secured to the bed of the pickup truck.

A latch assembly generally designated by the reference character 20 is composed of two basic elements, namely, a bracket-engaging member generally designated by the reference character 22 and a pivotal tire or rim-engaging member generally designated by the reference character 24.

The bracket-engaging member 22 includes a horizontally extending plate 26 which includes a vertical extension 28 at one end thereof. An internally threaded member, such as the nut 30, is secured to the vertical extension 28 by any convenient means, such as by welding. A threaded J-hooked rod is threadedly received in the nut and is provided with a hook 34 at one end. A lock nut (not shown) may be provided on the rod 32 on either side of the nut 30, as desired.

The pivotal tire or rim-engaging member 24 is comprised of a pivotal arm 36 which is pivotally connected to the horizontally extending plate 26 by means of a bolt 38, or by any other convenient pivotal connection. A handle 40 extends outwardly to the rear and adjacent the pivotal connection 38. At the end of the pivotal arm 36 opposite from the handle 40 is mounted a keeper bar 42 at right angles to the arm 36 and extending on both sides thereof as shown in FIG. 1. A tongue 44 is mounted at one end of the keeper bar (or pressure bar) at right angles thereto for a purpose which will hereinafter appear.

The horizontally extending plate 26 is provided with a hole 46 adjacent its forward end and the pivotal arm 36 is provided with a similar hole 48. When the pivotal arm and the horizontally extending plate or arm are in horizontal alignment, as shown in FIG. 2, the holes 26 and 36 are also in alignment such that a padlock 50 can be inserted through the holes to lock the latch assembly 20 in the FIG. 2 position.

Figure 2:
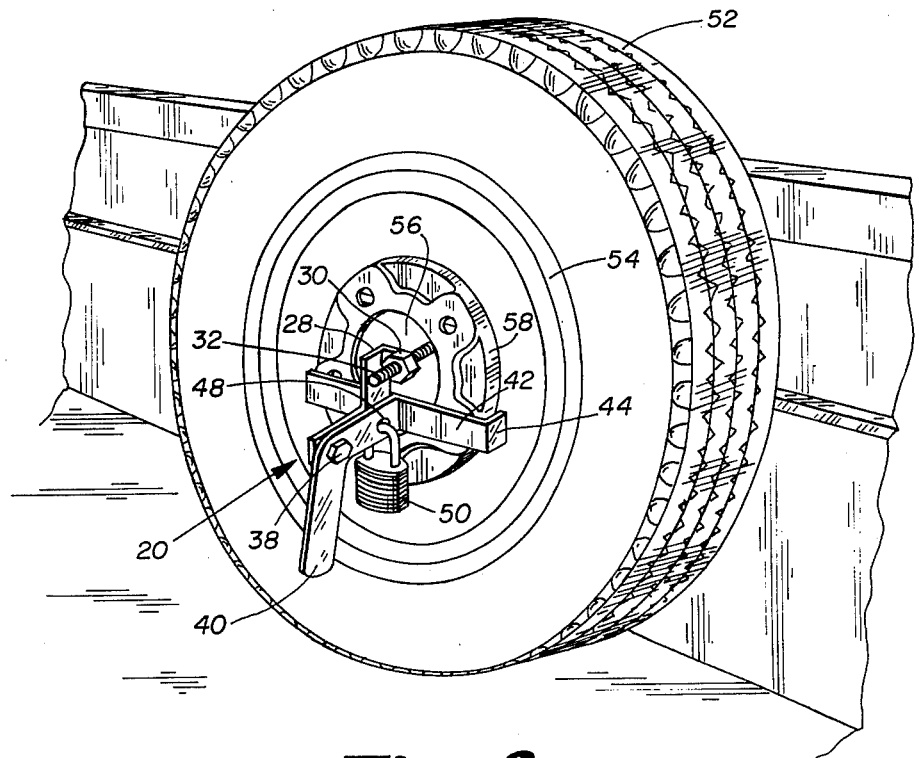
FIG. 2 is a perspective view showing the latch assembly in closed position against a tire.

FIG. 2 also shows a tire 52 mounted on a conventional rim 54 which is provided with a central opening 56. The rim 54 is also shown as having a flange 58 spaced slightly away from the opening 56.

In operation, a spare tire is placed in position in front of the notched angle bracket 10 with the valve stem side of the wheel toward the bracket. The center of the opening 56 of the rim should be adjacent the right-hand side, or notched side, of the angle bracket 10. With the latch assembly in the open position shown in FIG. 1, the J-hooked rod 32 is inserted through the opening 56 until the hook 34 engages a suitable one of the notches 12 on the angle bracket 10. The handle 40 is now engaged and the arm 24 is pivoted until the pressure bar 42 contacts the wheel at about the bottom of the center opening 56. At this point, the tongue 44 is aligned with the flange 58. Now the handle 40 is pushed downwardly until a positive over-center snap squeezes the tire to the side of the truck bed.

The rod 32 should be rotated in the nut 30 to move the hook 34 closer to, or farther away from, the nut 30 for a proper tension against the tire. The tire should be held tight enough so as to prevent rotation of the assembly with respect to the rod 32 when the latch assembly is in the position shown in FIG. 2. As indicated heretofore, the holes 46 and 48 in the stationary arm 26 and the pivotal arm 36, respectively, when aligned in the closed position of the assembly, are adapted to receive a standard padlock 50.

Whereas the present invention has been described in particular relation to the drawings attached hereto, it should be understood that other and further modifications, apart from those shown or suggested herein, may be made within the spirit and scope of this invention.

What is claimed is:

1. Apparatus for securing a spare tire to the bed of a pickup truck or the like wherein said tire is mounted on a flanged rim having an opening therethrough which comprises a vertically disposed bracket member having vertically spaced notches therein and attachable to said bed; a horizontally extending length adjustable bracket-engaging member having a hook at one end thereof adapted to engage one of the notches of said bracket when said bracket engaging member is passed through the opening in said tire rim; a pivotal tire rim-engaging member including a pivotal arm pivotally connected to the end of said bracket-engaging member opposite from said one end thereof, a horizontally extending keeper bar connected adjacent its horizontal center to one end of said pivotal arm adapted to engage said tire rim under pressure when said horizontally extending bracket is properly adjusted and when said pivotal arm is pivoted so as to be in horizontal alignment with said horizontally extending arm; means for pivoting said pivotal arm; and means for locking said pivotal arm to said horizontally extending arm when said arms are in horizontal alignment.

2. Apparatus for securing a spare tire to the bed of a pickup truck as set forth in claim 1 wherein said bracket-engaging member includes a horizontally extending arm having an upward extension adjacent one end thereof, a threaded nut attached to said vertical extension, a threaded J-hooked rod threadedly received in said nut and having said hook at one end thereof.

3. Apparatus for securing a spare tire to the bed of a pickup truck as set forth in claim 2 wherein said means for pivoting said pivotal arm comprises a handle member extending outwardly from said pivotal arm adjacent said pivotal connection; and wherein said tire rim-engaging member includes a tongue attached to one end of said keeper bar and extending at right angles thereto and adapted to lie adjacent the flange on said tire rim when said pivotal arm is pivoted by said handle so as to be in horizontal alignment with said horizontally extending arm; said pivotal arm and said horizontally extending arm having holes therein which are in alignment when said arms are in horizontal alignment whereby said locking means can be passed through said holes when aligned to lock said apparatus with said spare tire thereon against said bed.

4. Apparatus for securing a spare tire to the bed of a pickup truck as set forth in claim 1 wherein said means for pivoting said pivotal arm comprises a handle member extending outwardly from said pivotal arm adjacent said pivotal connection; and wherein said tire rim-engaging member includes a tongue attached to one end of said keeper bar and extending at right angles thereto and adapted to lie adjacent the flange on said tire rim when said pivotal arm is pivoted by said handle so as to be in horizontal alignment with said horizontally extending arm; said pivotal arm and said horizontally extending arm having holes therein which are in alignment when said arms are in horizontal alignment whereby said locking means can be passed through said holes when aligned to lock said apparatus with said spare tire thereon against said bed.

* * * * *